May 27, 1930.    H. BANY ET AL    1,760,537
REGULATING SYSTEM
Filed Nov. 10, 1928
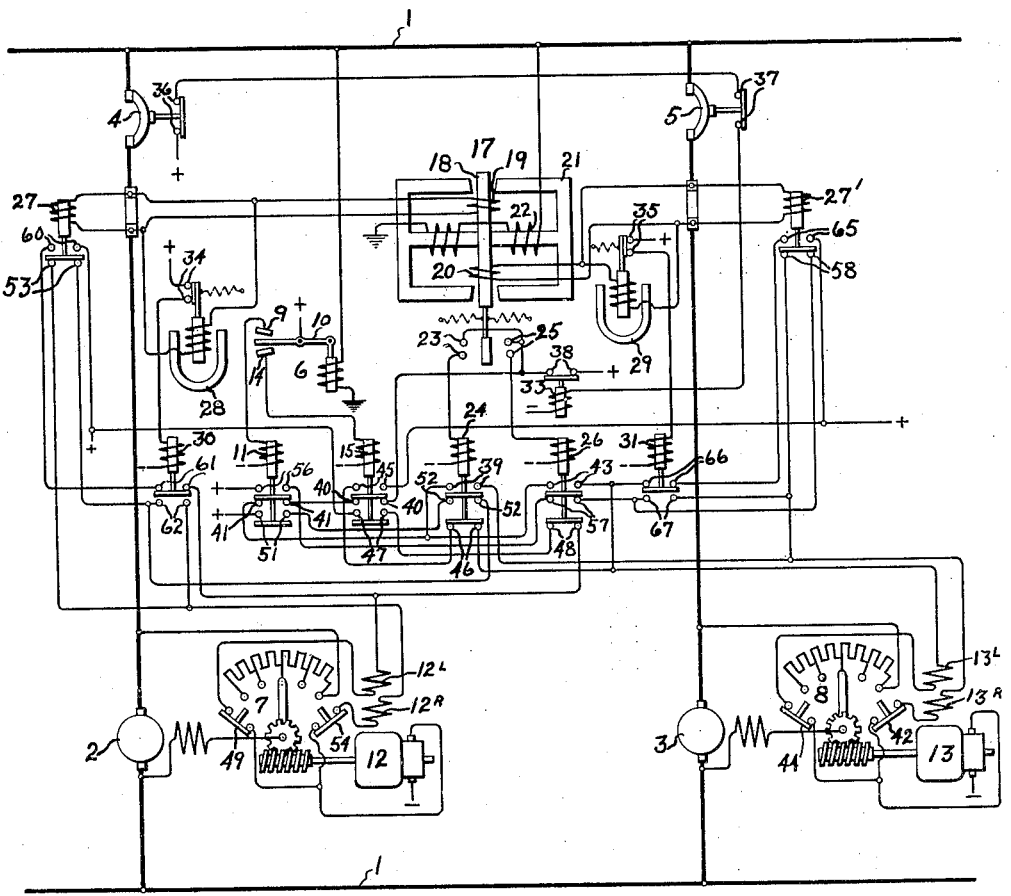
Inventor:
Herman Bany
Gordon R. McDonald
by Charles E. Tullar
His Attorney Patented May 27, 1930

1,760,537

UNITED STATES PATENT OFFICE

HERMAN BANY, OF YEADON, PENNSYLVANIA, AND GORDON R. McDONALD, OF SCHE-NECTADY, NEW YORK, ASSIGNORS TO GENERAL ELECTRIC COMPANY, A CORPORATION OF NEW YORK

REGULATING SYSTEM

Application filed November 10, 1928. Serial No. 318,538.

Our invention relates to regulating systems and particularly to a regulating system for maintaining a predetermined relation between the currents flowing through two parallel connected dynamo electric machines, which are adapted to supply current to and receive current from a common load circuit, and its object is to provide an improved system of this particular type.

Another object of our invention is to provide an improved regulating system of the type shown and claimed in Patent No. 1,693,306, issued November 27, 1928, to Gordon R. McDonald and assigned to the same assignee as this application.

In the arrangement disclosed in the above mentioned copending application both machines are provided with separate regulating control circuits which are normally controlled simultaneously in response to a predetermined electrical condition of the load circuit so as to maintain the electrical condition at a predetermined value. Means are also provided for effecting the operation of certain of the regulating control-circuits in response to the relative currents flowing through the machines when the load circuit electrical condition is at its normal value so as to maintain a predetermined percentage balance between the currents through the two machines.

In accordance with our invention the regulating control circuits of the two machines are selectively controlled so that when the predetermined electrical condition of the load circuit is not normal and the percentage unbalance between the currents flowing through the machines exceeds a predetermined value, the voltage of one or the other of the machines depending upon the current conditions, is controlled in such a manner that it operates to restore simultaneously the predetermined electrical condition of the load circuit to its normal value and the proper division of current between the machines. For example, if the load circuit voltage is the predetermined electrical condition of the load circuit which it is desired to maintain constant and it is below normal and one of the machines is supplying more than its normal portion of the total current only the voltage of the machine which is not supplying its normal portion of the total current is increased. Similarly, if the load circuit voltage is low and one of the machines is receiving more than its normal portion of the total from the load circuit only the voltage of the machine which is receiving more than its normal portion of the total current is increased.

Our invention will be better understood from the following description taken in connection with the accompanying drawing and its scope will be pointed out in the appended claims.

Referring to the accompanying drawing which shows diagrammatically an electric system embodying our invention, 1 represents an electric circuit which is arranged to be supplied by a plurality of sources of current which may be of any suitable type. As shown in the drawing, the circuit 1 is a direct current load circuit and two direct current machines 2 and 3 are connected in parallel across the load circuit 1. These machines are arranged in any suitable manner, examples of which are well known in the art, so that under certain conditions they supply current to the load circuit and under other conditions they receive current from the load circuit.

The machine 2 is arranged to be connected to the load circuit 1 by means of a circuit breaker 4 and the machine 3 is arranged to be connected to the load circuit 1 by means of a circuit breaker 5. These circuit breakers may be of any suitable type examples of which are well known in the art and so far as the present invention is concerned may be either manually or automatically controlled. In order to simplify the disclosure it is assumed that they are manually controlled but in actual practice they may be a part of an automatic switching equipment for automatically connecting the respective machines to the circuit 1 at the proper time. Examples of such automatic switching equipments are old and well known in the art.

When the machines 2 and 3 are connected to the load circuit 1, it may be desirable to control the machines so as to maintain some predetermined electrical condition of the machines, or load circuit, constant such for example as, the voltage at some point on circuit 1. For accomplishing this result a suitable control device, such as a contact making voltmeter 6, is provided which is connected so that it is energized in accordance with the condition where it is desired to maintain the voltage constant. This voltmeter 6 is arranged to control suitable regulating control circuits associated with each generator so that when the load circuit voltage varies from normal the voltmeter effects a change in the excitation of one or both of the machines so as to restore the load circuit voltage to normal. As shown in the drawing, the voltmeter 6 controls the motor operated rheostats 7 and 8 connected respectively in the shunt field circuits of the machines 2 and 3. When the voltage of the load circuit 1 is below a predetermined value so that contacts 9 and 10 of the voltmeter 6 are closed, a circuit for a control relay 11 associated with the voltmeter 6 is completed. When the control relay 11 is energized and a predetermined relation exists between the currents flowing through the machines, raising circuits are completed for the motors 12 and 13 of rheostats 7 and 8 respectively to effect an increase in the excitation of both of the machines 2 and 3.

When the voltage of the circuit 1 is above a predetermined value so that contacts 10 and 14 of the contact making voltmeter 6 are closed, a circuit for a control relay 15 is completed. The control relay 15 is so arranged that when it is energized and a predetermined relation exists between the currents flowing through the two machines, lowering circuits are simultaneously completed for the motors 12 and 13 of rheostats 7 and 8 respectively, so as to decrease the excitation of the machines 2 and 3.

In order to maintain a predetermined current division between the machines when they are supplying current to, or receiving current from, the circuit 1 so as to control selectively the operation of the rheostats 7 and 8 under all relative current conditions, we provide a polarized differential relay 17 which may be of any suitable type, examples of which are well known in the art. As shown in the drawing, the polarized relay 17 comprises an armature 18 energized by two windings 19 and 20 which are wound differentially with respect to each other and which are respectively connected in any suitable manner so as to be energized in accordance with the direction and magntude of the currents flowing through the machines 2 and 3 respectively. The armature 18 is pivoted between the polar projections of a stationary magnetic member 21 so that it occupies different positions, depending upon the direction of the resultant magnetomotive force produced by the currents through the windings 19 and 20. The magnetic member 21 may be a permanent magnet but preferably it is magnetized by means of a magnetizing winding 22 which is connected to a suitable source of current such as the load circuit 1. The armature 18 is arranged so that it occupies the position shown in the drawing when the ampere turns of the two windings 19 and 20 are substantially equal. When current is flowing from the machines 2 and 3 to the load circuit 1 and the ampere turns of the winding 19 exceed the ampere turns of the winding 20 the direction of the resultant flux in the armature 18 is such that the armature 18 is moved to the left and closes the contacts 23 to effect the energization of control relay 24. When the machines 2 and 3 are supplying current to the circuit 1 and the ampere turns of the winding 20 exceed the ampere turns of the winding 19, the direction of flux in the armature 18 is such that the armature 18 is moved to the right and closes the contacts 25 in the circuit of the control relay 26. The construction of the relay 17 is also such that when the machines 2 and 3 are receiving current from the line 1 and the ampere turns of the winding 19 exceed the ampere turns of the winding 20, the relay contacts 25 are closed and relay 26 is energized; when the ampere turns of the winding 20 exceed the ampere turns of the windig 19, the relay contacts 23 are closed and relay 24 is energized. Therefore, it would be observed that the control relay 24 is energized whenever the machine 2 is supplying more than its normal portion of the total load supplied by machines 2 and 3 also whenever the machine 3 is receiving from the circuit 1 more than its normal share of the total current received by machines 2 and 3 and that the control relay 26 is energized whenever the machine 3 is supplying more than its normal portion of the total current and whenever the machine 2 is receiving from circuit 1 more than its normal portion of the total current received by machines 2 and 3.

For the purpose of this description it will be assumed that the capacities of the two sources 2 and 3 are equal so that the differential relay 17 operates whenever the currents through the two machines 2 and 3 are unequal. It is to be understood however, that our invention is not limited to such an arrangement, as the relay 17 may be arranged to maintain any desired ratio between the currents flowing through the two sources.

As will be more fully described in connection with the operation of the arrangement shown in the drawing, the control relays 24 and 26 control the raising and lowering circuits of the motor operated rheostats 7 and 8 respectively, so as to maintain the proper division of the current between the two machines.

In order to limit the current flowing through each machine to a predetermined value when the machines are supplying current to circuit 1, the machines 2 and 3 are provided with the current responsive relays 27 and 27′ respectively. These relays are connected so that they are responsive to the amount of current flowing through the respective machines. These relays are connected in such a manner that they control the operation of the motor operated rheostat of the associated source so as to maintain the current output of the associated source below a predetermined value. In order, however, to render each current relay inoperative to limit the current flow through a machine when it is receiving current from the load, the machines 2 and 3 are respectively provided with the reverse current relays 28 and 29 and the associated control relays 30 and 31 which are so connected and arranged that when current flows from the load circuit 1 to the machines 2 and 3, the current relays 27 and 27′ cannot control the operation of the rheostats 7 and 8 to limit the amount of current flowing through machines 2 and 3. Under these conditions, the control of the rheostats 7 and 8 remains under the control of the contact-making voltmeter 6 and the current balance relay 17.

In order to render the current balance relay 17 inoperative to modify the regulation of one of the machines when it is the only one in service, we provide a relay 33 which is so connected that it is energized only when both of the machines 2 and 3 are connected to the load circuit 1. The relay 33 controls the circuits of the control relays 24 and 26 associated with the current balance relay 17 so that these control relays are energized to control the operation of the motor operated rheostats 7 and 8 only when both machines are in service. When only one machine is in service, its motor operated rheostat is controlled by its respective current relay, reverse current relay and the contact making voltmeter 6.

The operation of the arrangement shown in the drawing is as follows:

When both machines are connected to the load circuit and are supplying current thereto, the load circuit voltage is normal and the currents through the two machines are balanced and below predetermined values, the various control devices are in the positions shown in the drawing. The control relay 30 is energized as its circuit is completed through contacts 34 of the reverse current relay 28. The control relay 31 is energized as its circuit is completed through contacts 35 of the reverse current relay 29. The control relay 33 is energized as its circuit is completed through the auxiliary contacts 36 on the circuit breaker 4 and the auxiliary contacts 37 on the circuit breaker 5. The raising and lowering circuits of the two motor operated rheostats are not completed as the load circuit voltage is normal and the desired current relation exists between the two machines.

*Voltage normal, output of 2 exceeds output of 3*

When the load circuit voltage is normal both of the control relays 11 and 15 are deenergized. When the current output of the machine 2 exceeds the current output of the machine 3 by more than a predetermined amount, the current balance relay 17 closes its contacts 23 and completes the circuit of the control relay 24. The circuit of the control relay 24 also includes the contacts 38 of the control relay 33. Control relay 24 by closing its contacts 39 completes the raising circuit for the motor operated rheostat 8 associated with the machine 3. This raising circuit is from one side of a suitable control circuit through the contacts 38 of the energized control relay 33, contacts 40 of the deenergized control relay 15, contacts 41 of the deenergized control relay 11, contacts 39 of the energized control relay 24, field winding 13R of the motor 13, limit switch 42 on the rheostat 8, armature of motor 13 to the other side of the control circuit. When the raising circuit is completed the motor 13 operates and adjusts the rheostat 8 so as to increase the excitation of machine 3 and thereby increase the current output of machine 3, so as to restore the current division between the two machines to the desired value.

*Voltage normal, output of 3 exceeds output of 2*

When the load circuit voltage is normal and the current output of the machine 3 exceeds the current output of the machine 2 by more than a predetermined amount, the current balance relay 17 closes its contacts 25 and completes an energizing circuit for the control relay 26. The circuit of the control relay also includes contacts 38 of the energized control relay 33. The control relay 26 by closing its contacts 43 completes a lowering circuit for the motor 13 of the motor operated rheostat 8 so as to decrease the excitation and current output of machine 3 and thereby restore the division of the current between the two machines to the desired value. The lowering circuit for the motor 13 is from one side of the control circuit through contacts 38 of the energized control relay 33, contacts 40 of the deenergized control relay 15, contacts 41 of the deenergized control relay 11, contacts 43 of the energized control relay 26, field winding 13L of the motor 13, limit switch 44 on the rheostat 8, and the armature of motor 13 to the other side of the control circuit.

*Voltage normal, input of 2 equals input of 3*

When the machines 2 and 3 are receiving current from the load circuit 1 and the currents flowing through the two machines are equal and the load circuit voltage is normal the control devices are in positions shown in the drawing except that control relays 30 and 31 are deenergized since the contacts 34 and 35 of the reverse current relays 28 and 29 respectively are open. Under the assumed condition, however, no circuits are completed for the motor operated rheostats 7 and 8 since the load circuit voltage is normal and the current is flowing through the two machines in the desired manner.

*Voltage normal, current input of 2 exceeds current input of 3*

When the load circuit voltage is normal, the machines 2 and 3 are receiving current from the circuit, and the current input into machine 2 exceeds the current input into machine 3, the current balance relay 17 closes its contacts 25 and completes the energizing circuit for the control relay 26. The control relay 26 by closing its contacts 43 completes the lowering circuit traced above for the motor operated rheostat 8 through the contacts 41 of the deenergized control relay 11, the contacts 40 of the deenergized relay 15 and the contacts 38 of the energized relay 33, so that the excitation of machine 3 is decreased and the current input into machine 3 is increased to restore the desired balance between the input currents.

*Voltage normal, current input of 3 exceeds current input of 2*

When the load circuit voltage is normal, and the current input of 3 exceeds the current input of 2 by more than a predetermined amount, the current balance relay 17 closes its contacts 23 and completes the energizing circuit of the control relay 24. The control relay 24 by closing its contacts 39 completes the raising circuit traced above for the motor 13 through the contacts 41 of the deenergized relay 11, the contacts 40 of the deenergized relay 15 and the contacts 38 of the energized relay 33, so that the excitation of machine 3 is increased to decrease the current flowing through the machine 3 to restore the desired relation between currents flowing through the two machines.

*Voltage high, current output of 2 equals current output of 3*

When the voltage of the load circuit 1 is above a predetermined value so that the contacts 10 and 14 of the contact making voltmeter 6 are closed and the control relay 15 is energized and the current outputs of machines 2 and 3 are equal so that both of the control relays 24 and 26 are deenergized, a lowering circuit is completed for each of the motor operated rheostats to decrease the excitation of both machines. The lowering circuit for the motor 13 is from one side of the control circuit through the contacts 45 of the energized control relay 15, contacts 46 of the deenergized control relay 24, field winding 13L of the motor 13, limit switch 44, armature of motor 13 to the other side of the control circuit. The lowering circuit for motor 12 is from one side of the control circuit through contacts 47 of the energized control relay 15, contacts 48 of the deenergized control relay 26, field winding 12L of the motor 12, limit switch 49, armature of the motor 12 to the other side of the control circuit. Therefore, when the load circuit voltage is high and the current outputs of the two machines are equal the excitation of both machines is simultaneously decreased to restore the load circuit voltage to its normal value.

*Voltage high, output of 2 exceeds output of 3*

When the load circuit voltage is above a predetermined value so that the control relay 15 is energized and the current output of machine 2 exceeds the current output of machine 3 by more than a predetermined amount so that the control relay 24 is energized, the lowering circuit, previously traced, for the rheostat 7 is completed but the lowering circuit for the rheostat 8, traced in the preceding paragraph, is not completed because this lowering circuit is opened at the contacts 46 of the energized control relay 24 and therefore it will be observed that when the load circuit voltage is above normal and the current output of machine 2 exceeds the current output of machine 3, only the excitation of the machine 2, which is carrying the greater load, is varied.

*Voltage high, current output of 3 exceeds current output of 2*

When the load circuit voltage is above a predetermined value and the current output of machine 3 exceeds the output of machine 2 by more than a predetermined amount, so that the control relay 26 is energized, the lowering circuit traced above for the motor operated rheostat 8 is completed but the lowering circuit for the motor operated rheostat 7 traced in a preceding paragraph, is not completed because this lowering circuit is opened at contacts 48 of the energized relay 26. Therefore, when the load circuit voltage is above normal, and the current output of machine 3 exceeds the current output of machine 2, only the excitation of machine 3 is decreased to restore the load circuit voltage to normal, and the desired division of current between the two machines.

*Voltage high, current input into 2 equals current input into 3*

When the load circuit voltage is high and the machines 2 and 3 are receiving current from the load circuit and the input currents of the machines 2 and 3 are equal, the lowering circuit traced above for the motor operated rheostat 8, is completed through contacts 45 of the energized control relay 15 and contacts 46 of the deenergized control relay 24, and the above traced lowering circuit for the motor operated rheostat 7 is completed through contacts 48 of the deenergized control relay 26 and contacts 47 of the energized control relay 15. Therefore, whenever the load circuit voltage is high and the current divided between the two machines in the desired manner, the excitation of both machines is simultaneously decreased to restore the load circuit voltage to normal.

*Voltage high, current input of 2 exceeds current input of 3*

When the load circuit voltage is above a predetermined value so that the control relay 15 is energized, and the machines 2 and 3 are receiving current from the load circuit and the current input into machine 2 exceeds the current input into machine 3 so that the control relay 26 is energized, the lowering circuit for the motor operated rheostat 8 is completed through contacts 46 of the deenergized control relay 24 and contacts 45 of the energized control relay 15. The above traced lowering circuit for the motor operated rheostat 7 is not completed, however, since this lowering circuit is opened at contacts 48 of the energized control relay 26. Therefore, when the load circuit voltage is above normal and the current input of machine 2 exceeds the current input of machine 3 by more than a predetermined amount only the excitation of machine 3, which is receiving the smaller current, is decreased to restore the load circuit voltage to normal and the desired division of current between the two machines.

*Voltage high, current input of 3 exceeds current input of 2*

When the load circuit voltage is above normal so that the control relay 15 is energized and the machines 2 and 3 are receiving current from the load circuit and the current input into the machine 3 exceeds the current input into the machine 2 by a predetermined amount so that the control relay 24 is energized, the lowering circuit traced above for the motor operated rheostat 7, is completed through contacts 48 of the deenergized control relay 26 and contacts 47 of the energized control relay 15, to decrease the excitation of the machine 2. The lowering circuit for the motor operated rheostat 8, traced above, is open at contacts 46 of the energized control relay 24. Therefore, when the load circuit voltage is above normal and the current input into machine 3 exceeds the current input into machine 2 by more than a predetermined amount only the excitation of machine 2, which is receiving the smaller current, is decreased to restore the load circuit voltage to normal and the proper division of current between the machines.

*Voltage low, current output of 2 equal to current output of 3*

When the load circuit voltage is below a predetermined value so that the control relay 11 is energized and the output currents of machines 2 and 3 are equal so that both of the control relays 24 and 26 are deenergized, the raising circuits for both of the motor operated rheostats are simultaneously completed to increase the excitation of both machines. The raising circuit for the motor operated rheostat 7 is from one side of the control circuit through contacts 51 of the energized control relay 11, contacts 52 of the deenergized control relay 24, contacts 53 of the current relay 27, field winding 12R of motor 12, limit switch 54 of the rheostat 7, armature of motor 12 to the other side of the control circuit. The raising circuit for the motor operated rheostat 8 is from one side of the control circuit through contacts 56 of the energized control relay 11, contacts 57 of the deenergized control relay 26, contacts 58 of the current relay 27', field winding 13R of motor 13, limit switch 42 of the rheostat 8, armature of the motor 13 to the other side of the control circuit. Therefore, when the load circuit voltage is below normal and the output currents of the two machines are equal the excitation of both machines is simultaneously increased to restore the load circuit voltage to normal.

*Voltage low, current output of 2 exceeds current output of 3*

When the load circuit voltage is below a predetermined value so that the control relay 11 is energized and the current output of machine 2 exceeds the current output of machine 3 by more than a predetermined amount so that the control relay 24 is energized, the raising circuit for the rheostat 8, traced above, is completed through contacts 58 of relay 27', contacts 57 of deenergized control relay 26 and contacts 56 of energized control relay 11, to increase the excitation of machine 3. The raising circuit for the motor operated rheostat 7, however, is open at contacts 52 of the energized control relay 24. Therefore, when the load circuit voltage is below normal and machine 2 is supplying more current than the machine 3, the excitation of machine 3, which is supplying the smaller current, is increased to restore the load circuit voltage to normal and to restore the desired balance between the currents through the two machines.

*Voltage low, current output of 3 exceeds current output of 2*

When the load circuit voltage is below a predetermined value so that control relay 11 is energized and the current output of machine 3 exceeds the current output of machine 2 by more than a predetermined amount so that control relay 26 is energized, the above traced raising circuit for rheostat 7 through contacts 53 of relay 27, contacts 52 of deenergized control relay 24 and contacts 51 of the energized control relay 11 is completed to increase the excitation of machine 2. The above traced raising circuit for rheostat 8, however, is not completed as this raising circuit is open at contacts 57 of the energized control relay 26. Therefore, when the load circuit voltage is below normal and the current output of machine 3 exceeds the current output of machine 2 only the excitation of machine 2, which is supplying the smaller current, is increased to restore the load circuit voltage to normal and the desired balance between the currents flowing through the two machines.

*Voltage low, current input of 2 equal to current input of 3*

When the load circuit voltage is below a predetermined value so that the control relay 11 is energized and the machines 2 and 3 are receiving current from the load circuit and the input currents of the machines 2 and 3 are equal so that control relays 24 and 26 are deenergized, the above traced raising circuits for the motor operated rheostats 7 and 8 are completed to effect the simultaneous increase in the excitation of both of the machines, 2 and 3, to restore the load circuit voltage to normal.

*Voltage low, current input into 2 exceeds current input into 3*

When the load circuit voltage is below a predetermined value so that the control relay 11 is energized and the machines 2 and 3 are receiving current from the load circuit and the current input into machine 2 exceeds the current input into machine 3 by more than a predetermined amount so that control relay 26 is energized, the above traced raising circuit for rheostat 7 through contacts 53 of relay 27, contacts 52 of deenergized relay 24, and contacts 51 of the energized relay 11 is completed to increase the excitation of machine 2. The above traced raising circuit for rheostat 8, however, is open at contacts 57 of the energized control relay 26. Therefore, when the load circuit voltage is below normal and the current input of machine 2 exceeds the current input of machine 3 by more than a predetermined amount, only the excitation of machine 2 is increased to restore the load circuit voltage to normal and the proper division of current between the two machines.

*Votlage low, current input of 3 exceeds current input of 2*

When the load circuit voltage is below a predetermined value so that the control relay 11 is energized and the machines 2 and 3 are receiving current from the load circuit and the current input into machine 3 exceeds the current input into machine 2 by more than a predetermined amount so that the control relay 24 is energized, the above traced raising circuit for motor operated rheostat 8, through contacts 58 of the relay 27', contact 57 of the deenergized control relay 26 and contacts 56 of the energized control relay 11 is completed to increase the excitation of the machine 3. The above traced raising circuit for rheostat 7 is not completed as this circuit is open at contacts 52 of the energized control relay 24. Therefore, when the load circuit voltage is below normal and the current input of machine 3 exceeds the current input of machine 2, only the excitation of machine 3 is increased to restore the load circuit voltage to normal and the desired balance between the currents through the two machines.

From the above description it will be observed that when the voltage is normal and the currents flowing through the machines become unbalanced, only the excitation of machine 3 is varied to restore the desired balance between the currents. When the load circuit voltage is either above normal or below normal and the currents flowing through the two machines are balanced the excitations of both machines are simultaneously varied to restore the voltage to normal. When the load circuit voltage is above normal and one machine is supplying more than its normal portion of the load, the excitation of that machine is decreased to restore the load circuit voltage to normal and to restore the desired balance between the two current outputs. When the load circuit voltage is above normal and one machine, receives more than its normal portion of the total current received from the load circuit, the excitation of the machine receiving less than its normal portion of the total current is decreased to restore the voltage to normal and the desired balance between the current inputs of the two machines. When the load circuit voltage is below a predetermined value and one machine is supplying more than its normal share of the total current, the excitation of the other machine, which is supplying less than its normal share of the total current, is increased to restore the voltage to normal and the desired balance between the current outputs of the two machines. When the load circuit voltage is below normal and one machine is receiving less than its normal share of the total current from the line, the excitation of the machine which is receiving more than its normal share of current is increased to restore the load circuit voltage to normal and the desired relation between the current inputs of the two machines.

If at any time the current through machine 2 exceeds a predetermined value, the current relay 27 operates to open its contact 53 and close its contacts 60. If machine 2 is supplying current to the load circuit when relay 27 operates, the operation of the relay 27 removes the control of the rheostat 7 from the contact making voltmeter 6 and the current balance relay 17 and effects a decrease in the excitation of the machine 2 until the current output of the machine 2 decreases below a predetermined value. Relay 27 by opening its contacts 53 interrupts the raising circuit for the rheostat 7 so that the contact making voltmeter 6 and current balance relay 17 cannot effect the operation of the rheostat 7 to increase the excitation of the machine 2. The relay 27 by closing its contacts 60 completes a lowering circuit for the rheostat 7. This circuit is from one side of the control circuit through contacts 60 of the current relay 27, contacts 61 of the energized control relay 30, field winding 12L of the motor 12, limit switch 49 of the rheostat 7, armature of motor 12 to the other side of the control circuit. This lowering circuit remains closed until the output of the machine 2 is decreased sufficiently to permit relay 27 to open its contacts 60.

If, however, machine 2 is receiving current from the load circuit when relay 27 operates, the operation of relay 27 does not remove the control of the rheostat 7 from the contact making voltmeter 6 and the current balance relay 17 because when current is flowing from the load circuit to machine 2, control relay 30 is deenergized. The contacts 62 of the control relay 30 when deenergized complete a shunt circuit around contacts 53 of relay 27, in the raising circuit of the rheostat 7. Also when the control relay 30 is deenergized, the above traced lowering circuit for the rheostat 7 through contacts 60 of the current relay 27 is open at the contacts 61 of the deenergized relay 30.

The current relay 27' associated with machine 3 is arranged in a similar manner to limit the amount of current flowing through the machine 3 only when the output of the machine 3 exceeds a predetermined value. Whenever the current flowing through the machine 3 exceeds a predetermined value, relay 27' opens its contacts 58 in the raising circuit for rheostat 8 and closes its contacts 65 so as to complete through contacts 66 of the relay 31, if this relay is energized, a lowering circuit for the rheostat 8. If, however, machine 3 is receiving current from the load circuit when relay 27' closes its contacts 65 the relay 31 is deenergized so that the lowering circuit through contacts 65 of the relay 27' is not completed. When the relay 31 is deenergized, a shunt circuit is completed around contacts 58 of relay 27' through contacts 67 of the deenergized control relay 31, so that the raising circuit of the rheostat 8 can be completed by the contact voltmeter 6 and current balance relay 17.

It will be observed from the above description that the current relays 27 and 27' are arranged to remove the control of their respective rheostats from the contact making voltmeter 6 and the current balance relay 17 only when the direction of current flow is from their respective machines to the load circuit.

While we have, in accordance with the patent statutes, shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:

1. In combination, a load circuit, two parallel connected dynamo electric machines supplying current thereto, and means responsive to the voltage of said circuit and to the relative current outputs of said machines for decreasing only the excitation of the machine carrying more than its normal portion of the total load when the load circuit voltage is above a predetermined value and one of the machines is supplying more than its normal share of the total current outputs of the two machines.

2. In combination, a load circuit, two parallel connected dynamo electric machines supplying current thereto and means responsive to the voltage of said circuit and to the relative current outputs of said machines for decreasing only the excitation of the machine which is carrying more than its normal portion of the total load when the load circuit voltage is above a predetermined value and a predetermined relation does not exist between the current outputs of the two machines, and for decreasing the excitation of both machines simultaneously when the load circuit voltage is above a predetermined value and the predetermined relation exists between the current outputs of the two machines.

3. In combination, a load circuit, two parallel connected dynamo electric machines supplying current thereto and means responsive to the voltage of said circuit and to the relative current outputs of the two machines for increasing only the excitation of the machine carrying less than its normal share of the total load when the load circuit voltage is below a predetermined value and one machine is supplying more than its normal share of the total current outputs of the two machines.

4. In combination, a load circuit, two parallel connected dynamo electric machines supplying current thereto and means responsive to the voltage of said circuit and to the relative current outputs of the two machines for increasing only the excitation of the machine carrying less than its normal share of the total load when the load circuit voltage is below a predetermined value and a predetermined relation does not exist between the current outputs of the two machines, and for increasing the excitation of both machines simultaneously when the load circuit voltage is below a predetermined value and the predetermined relation exists between the current outputs of the two machines.

5. In combination, an electric circuit, two parallel connected dynamo electric machines connected to said circuit and receiving current therefrom and means responsive to the voltage of said circuit and to the relative currents flowing through said machines for decreasing only the excitation of the machine receiving less than its normal portion of the total current received from the circuit when the voltage of said circuit is above a predetermined value and the proper division of current does not exist between the currents flowing through said machines.

6. In combination, an electric circuit, two parallel connected dynamo electric machines connected to said circuit and receiving current therefrom and means responsive to the voltage of said circuit and to the relative currents flowing through said machines for decreasing only the excitation of the machine receiving less than its normal portion of the total current received from the circuit when the voltage of said circuit is above a predetermined value and a predetermined relation does not exist between the currents flowing through said machines, and for decreasing the excitation of both machines simultaneously when the load circuit voltage is above a predetermined value and the predetermined relation exists between the currents flowing through said machines.

7. In combination, an electric circuit, two parallel connected dynamo electric machines connected to said circuit and receiving current therefrom and means responsive to the voltage of said circuit and to the relative currents flowing through said machine for increasing only the excitation of the machine receiving more than its normal portion of the total current received by the two machines when the load circuit voltage is below a predetermined value and a predetermined relation does not exist between the currents flowing through said machines.

8. In combination, an electric circuit, two parallel connected dynamo electric machines connected to said circuit and receiving current therefrom and means responsive to the voltage of said circuit and to the relative currents flowing through said machine for increasing only the excitation of the machine receiving more than its normal portion of the total current received by the two machines when the load circuit voltage is below a predetermined value and a predetermined relation does not exist between the currents flowing through said machines, and for increasing the excitation of both machines simultaneously when the load circuit voltage is below a predetermined value and the predetermined relation exists between the currents flowing through said machines.

9. In combination, a load circuit, two sources of current connected in parallel across said circuit, regulating means associated with each source for varying the output thereof, and means responsive to a predetermined electrical condition of said sources and to the relative current outputs of said sources for effecting only the operation of the regulating means associated with the source supplying more than its normal share of the total load when said predetermined electrical condition is above a predetermined value and a predetermined relation does not exist between the current outputs of the two sources.

10. In combination, a load circuit, two sources of current connected in parallel across said circuit, regulating means associated with each source for varying the output thereof, and means responsive to a predetermined electrical condition of said sources and to the relative current outputs of said sources for effecting only the operation of the regulating means associated with the source supplying less than its normal portion of the total load when said predetermined electrical condition is below a predetermined value and a predetermined relation does not exist between the current outputs of the two sources.

11. In combination, an electric circuit, two dynamo electric machines connected in parallel across said circuit and receiving current therefrom, regulating means associated with each machine for controlling the current flowing therethrough, and means responsive to a predetermined electrical condition of said machines and to the relative currents flowing through said machines for effecting only the operation of the regulating means associated with the machine receiving less than its normal portion of the total current received by the two machines when said predetermined electrical condition is above a predetermined value and a predetermined unbalance exists between the currents flowing through said machines.

12. In combination, an electric circuit, two dynamo electric machines connected in parallel across said circuit and receiving current therefrom, regulating means associated with each machine for controlling the current flowing therethrough, and means responsive to a predetermined electrical condition of said machines and to the relative currents flowing through said machines for effecting only the operation of the regulating means associated with the machine receiving more than its share of the total current received by the two machines when said predetermined electrical condition is below a predetermined value and a predetermined unbalance exists between the currents flowing through said machines.

13. In combination, a load circuit, two sources of current connected in parallel across said circuit, regulating means associated with each source for varying the output thereof, means including a raising circuit associated with each regulating means for effecting the operation thereof to increase the current output of the associated source when the associated raising circuit is completed, means responsive to a predetermined electrical condition of said sources for effecting the simultaneous completion of both of said raising circuits when said predetermined electrical condition of said sources is below a predetermined value, and means responsive to the relative current outputs of said sources for selectively controlling said raising circuits so that said electrical condition responsive means effects the completion of only one of said raising circuits when a predetermined relation does not exist between the current outputs of said sources and said predetermined electrical condition is below a predetermined value.

14. In combination, a load circuit, two sources of current connected in parallel across said circuit, regulating means associated with each source for varying the output thereof, means including a raising circuit associated with each regulating means for effecting the operation thereof to increase the current output of the associated source when the associated raising circuit is completed, means responsive to the voltage of said sources for effecting the simultaneous completion of both of said raising circuits when said voltage is below a predetermined value, and means responsive to the relative current outputs of said sources for selectively controlling said raising circuits so that said voltage responsive means effects the completion of only the raising circuit associated with the source supplying less than its normal portion of the total current when one of said sources is supplying more than its normal portion of the total current and the voltage of said source is below a predetermined value.

15. In combination, a load circuit, two sources of current connected in parallel across said circuit, regulating means associated with each source for varying the output thereof, means including a lowering circuit associated with each regulating means for effecting the operation thereof to decrease the current output of the associated source when the associated lowering circuit is completed, means responsive to a predetermined electrical condition of said sources for effecting the simultaneous completion of both of said lowering circuits when said predetermined electrical condition of said sources is above a predetermined value, and means responsive to the relative current outputs of said sources for selectively controlling said lowering circuits so that said electrical condition responsive means effects the completion of only one of said lowering circuits when a predetermined relation does not exist between the current outputs of said sources and said predetermined electrical condition is above a predetermined value.

16. In combination, a load circuit, two sources of current connected in parallel across said circuit, regulating means associated with each source for varying the output thereof, means including a lowering circuit associated with each regulating means for effecting the operation thereof to decrease the current output of the associated source when the associated lowering circuit is completed, means responsive to the voltage of said sources for effecting the simultaneous completion of said lowering circuits when said voltage is above a predetermined value, and means responsive to the relative current outputs of said sources for selectively controlling said lowering circuits so that said voltage responsive means effects the completion of only the lowering circuit associated with the source supplying more than its normal portion of the total current when the total current is not divided between the sources in a predetermined manner and the voltage of said source is above a predetermined value.

17. In combination, an electric circuit, two dynamo electric machines connected in parallel across said circuit, regulating means associated with each machine for varying the excitation thereof, means including a raising circuit associated with each regulating means for effecting the operation thereof to increase the excitation of the associated machine when the associated raising circuit is completed, means responsive to a predetermined electrical condition of said machines for effecting the simultaneous completion of both of said raising circuits when said predetermined electrical condition of said machines is below a predetermined value, and means responsive to the direction and relative magnitudes of the currents through said machines for selectively controlling said raising circuits so that said electrical condition responsive means when said predetermined condition is below a predetermined value effects the completion of one of said raising circuits only when current flows from said electric circuit to said machines and the current through one of said machines is too large relative to the current through the other machine, and when current flows from said machines to said electric circuit and the current through said other machine is too large relative to the current through said one of said machines.

18. In combination, an electric circuit, two dynamo electric machines connected in parallel across said circuit, regulating means associated with each machine for varying the excitation thereof, means including a raising circuit associated with each regulating means for effecting the operation thereof to increase the excitation of the associated machine when the associated raising circuit is completed, means responsive to the voltage of said machines for effecting the simultaneous completion of both of said raising circuits when said voltage is below a predetermined value, and a polarized relay having differentially arranged current windings respectively energized in accordance with the direction and magnitude of the currents through said machines for selectively controlling said raising circuits so that said voltage responsive means when the voltage of said machines is below a predetermined value effects the completion of each raising circuit only when the associated machine is supplying less than its normal portion of the total current supplied to the electric circuit and when the associated machine is receiving more than its normal portion of the total from the electric circuit.

19. In combination, an electric circuit, two dynamo electric machines connected in parallel across said circuit, regulating means associated with each machine for varying the excitation thereof, means including a lowering circuit associated with each regulating means for effecting the operation thereof to decrease the excitation of the associated machine when the associated lowering circuit is completed, means responsive to a predetermined electrical condition of said machines for effecting the simultaneous completion of both of said lowering circuits when said predetermined electrical condition of said machines is above a predetermined value, and means responsive to the direction and relative magnitudes of the currents through said machines for selectively controlling said lowering circuits so that said electrical condition responsive means when said predetermined condition is above a predetermined value effects the completion of one of said lowering circuits only when current flows from said electric circuit to said machines and one of said machines carries more than its normal portion of the total current, and when current flows from said machines to said electric circuit and the other machine carries more than its normal portion of the total current.

20. In combination, an electric circuit, two dynamo electric machines connected in parallel across said circuit, regulating means associated with each machine for varying the excitation thereof, means including a lowering circuit associated with each regulating means for effecting the operation thereof to decrease the excitation of the associated machine when the associated lowering circuit is completed, means responsive to the voltage of said machines for effecting the simultaneous completion of both of said lowering circuits when said voltage is above a predetermined value, and a polarized relay having differentially arranged current windings respectively connected so as to be energized in accordance with the direction and magnitudes of the current through said machines for selectively controlling said lowering circuits so that said voltage responsive means when the voltage of said machine is above a predetermined value effects the completion of each lowering circuit only when the associated machine is supplying more than its normal portion of the total current to the electric circuit, and when the associated machine is receiving less than its normal portion of the total current from the electric circuit.

21. In combination, an electric circuit, a source of current connected thereto, regulating means associated with said source, means responsive to the voltage of said circuit, and means responsive to the magnitude and direction of the current flow between said source and circuit and cooperating with said voltage responsive means to control said regulating means so that said circuit voltage is maintained at a predetermined value under all conditions of current flow except when the current flowing from said source to said circuit exceeds a predetermined value.

22. In combination, an electric circuit, a source of current connected thereto, regulating means associated with said source, means responsive to the voltage of said circuit normally arranged to control said regulating means so as to maintain the circuit voltage constant at a predetermined value under all conditions of current flow between said source and circuit, and means responsive to the magnitude and direction of the current flow between said source and circuit for removing the control of said regulating means from said voltage responsive means and controlling said regulating means so as to limit the current flowing through said source to a predetermined value only when current flowing from said source to said circuit tends to exceed a predetermined value.

23. In combination, an electric circuit, a dynamo electric machine connected to said circuit, regulating means for controlling the excitation of said machine including a raising circuit which when completed effects an increase in the excitation of said machine and and a lowering circuit which when completed effects a decrease in the excitation of said machine, means responsive to the voltage of said electric circuit normally arranged to complete said raising circuit whenever the electric circuit voltage is below a predetermined value and to complete said lowering circuit whenever the electric circuit voltage is above a predetermined value, and means responsive to the magnitude and direction of the current flow between said machine and electric circuit for removing the control of said raising and lowering circuits from said voltage responsive means and for controlling them to limit the current flow through said machine to a predetermined value only when current flows from said machine to said circuit.

In witness whereof, we have hereunto set our hands this 7th day of November, 1928, and this 31st day of October, 1928, respectively.

HERMAN BANY.
GORDON R. McDONALD.